Figure 1:
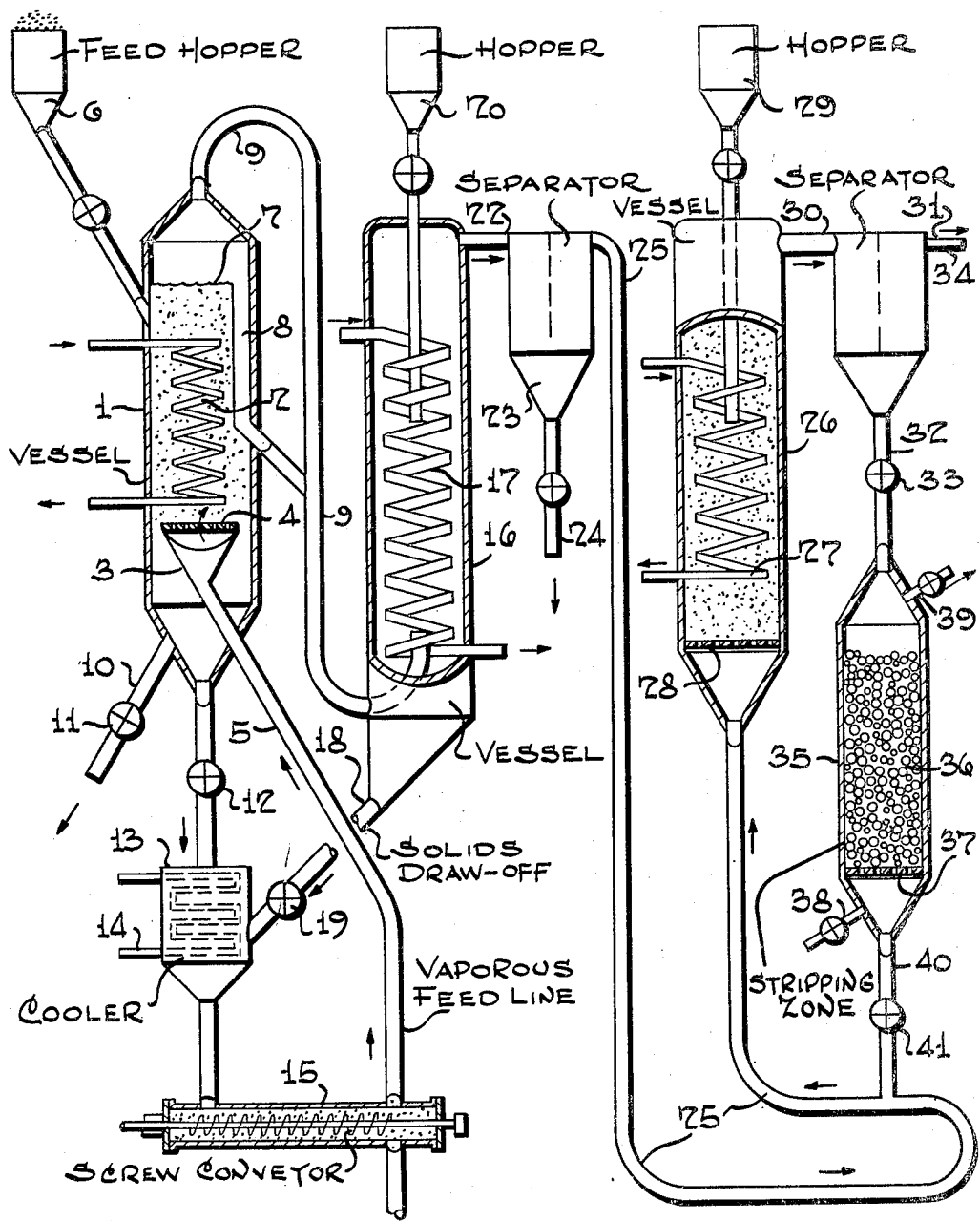

Aug. 19, 1952 W. K. LEWIS 2,607,440
RECOVERING CONDENSIBLE MATERIAL FROM VAPOROUS MIXTURES
Filed Oct. 21, 1947 3 Sheets-Sheet 3

Warren K. Lewis Inventor
By Henry Burk Attorney

Patented Aug. 19, 1952

2,607,440

UNITED STATES PATENT OFFICE 2,607,440

RECOVERING CONDENSIBLE MATERIAL FROM VAPOROUS MIXTURES

Warren K. Lewis, Newton, Mass., assignor to Standard Oil Development Company, a corporation of Delaware Application October 21, 1947, Serial No. 781,096

3 Claims. (Cl. 183—119)

The present invention is directed to a method for recovering material of low volatility from a vaporous mixture in which it is present with a relatively large quantity of non-condensible gas. More specifically, it is directed to the recovery of normally solid constituents from such a vapor mixture and specifically to the recovery of phthalic anhydride, and similar sublimable solids which are solid at condensation temperature, from such diluted vapor mixtures.

If a vaporous mixture containing a minor quantity of a substance of low volatility associated with a relatively large quantity of non-condensible gas is cooled by contact with a cold surface to a temperature below the dew point of the condensible constituent, the latter starts to condense with a simultaneous occurrence of two diffusional phenomena, the diffusion of heat from the mixture to the cooling surface with a corresponding drop in temperature of the mixture and the diffusion of the vapor of the condensible constituent from the main body of the gas vapor mixture to the cooling surface with a consequent decrease in concentration of the vapor in the main body accompanying the decrease in temperature. In the case of water vapor, the diffusion of the vapor keeps almost perfect step with the drop of temperature so that the change in vapor content of the gas is practically linear with the change of temperature. In the case of vapors of high molecular weight, such as phthalic anhydride and naphthalene, the diffusional velocity of the vapor is far lower than that of water but the thermal conductivity of the mixture is substantially the same. The consequence is that the temperature of the mixture drops far more rapidly than the vapor content of the mixture. Consequently, the vapor, at a point near but not on the condensing surface, gets saturated and condensation begins to occur, not on the cooling condensation surface but in the gas mixture itself. As a result, fine particles of condensed vapor are formed as a fog in the gas mixture. These fine particles or fog are very difficult to remove. Bag filters have been employed for their removal but they usually pass to a considerable degree through the most efficient bag filters.

The principal object of the present invention is the provision of a method by which it is possible to condense vapors of substances of low volatility from vaporous mixtures in which they are mixed with relatively large quantities of noncondensible gas without the formation of fog.

A more specific object of the present invention is the provision of a method conducted in at least two stages, in the first stage of which the temperature is maintained at a level at which the material to be recovered will condense but still has a substantial vapor pressure, and in the second stage of which the condensation is conducted at a lower temperature, a relatively dense body of fluidized solids being maintained in each stage.

An additional object of the present invention is the provision of a method in which condensible materials of the character referred to are caused to deposit on a finely divided inert solid at a temperature below condensation temperature whereby said materials are separated from diluting gases and the condensed material is then recovered from the inert solid by stripping said inert solid with concentrated superheated vapors of said material or other suitable condensible material.

According to the present invention, condensation of substances having a low volatility from vaporous mixtures containing them diluted with non-condensible gases is effected by maintaining in the condensation zone a dense suspension of fluidized solid, which solid may be in a proper case the same material the vapors of which are to be condensed. Broadly, this technique is not new. In the process of the present invention, however, conditions are adjusted so as to take advantage of the tendency of small particles in the neighborhood of large particles to vaporize and condense on the large particles. In order to facilitate this action, the condensation is conducted in at least two stages. In the first stage the temperature is such that the vapor pressure of the material to be recovered is low enough to remove a large fraction of it but high enough so that when close together small particles will rapidly disappear and larger particles rapidly grow in size. This means that the temperature is just below the vaporizing temperature of the solid to be recovered. In the second stage the temperature is considerably lower so as to effect the condensation of the last vestiges of the vaporous materials to be recovered.

In the second stage of the process just described there may be a tendency for some fogging to occur. Any fogging which would occur would be very small, however, because the amount of condensible vapor entering the second stage is small and because the fogging tendency is curtailed by the presence of fluidized solid in the condensation zone. If desired, however, the gaseous residue from the second stage is passed through a third stage in which powdered inert material is maintained in the form of a dense, fluidized suspension at a temperature substantially below the condensation temperature of the material to be recovered. This dense suspension acts, in effect, like a filter. The condensed material mixed with the inert material can be recovered therefrom in a manner hereinafter described.

In a specific embodiment of the present invention, the fluidized solid used to facilitate condensation of the vaporous material is an inert material such as ground inorganic gels, clay, carbon, or the like. Where the condensation is carried out in the single stage, a fluidized dense suspension of this inert material is maintained in the condensation zone at a temperature substantially below the condensation temperature of the material to be recovered and the vaporous mixture containing said material is passed through it. This finely divided inert material is continuously withdrawn from the condensation chamber carrying with it the condensed material. In order to recover the condensed material from the inert material the mixture is subjected to stripping with a superheated concentrated vapor of the condensed material which serves to vaporize the condensed material and remove it from the inert solid. The resulting vapors can easily be condensed without encountering any fogging difficulties. This superheated vapor may be mixed with considerable quantities of inert gas, in which case this gas is recycled after condensation of a substantial portion of its final vapor content. Fogging in this condensation step is not serious because of the recycle, but can be minimized by carrying out the condensation at a relatively high temperature, just low enough to get the necessary condensation. It may be pointed out here that it is only where materials of low volatility are greatly diluted with other non-condensible gases that serious fogging difficulties are encountered.

Reference has been made to fluidized, dense suspensions of solids. It will be understood that the solids employed to produce such suspensions are finely divided, usually containing no particles larger than about 10 mesh and predominantly smaller than 100 mesh. For a good fluidization it is preferred that the finely divided material include widely differing particle sizes, ranging upwardly from about 20 microns to about 100 mesh. A substantial fraction should be between 200 and 400 mesh. The vaporous mixture passing through the condensation zone should have a superficial velocity between about .5 and 5 ft./second in order to maintain a suspension of suitable density in the condensation zone. This suspension should preferably contain about at least 5% by volume of solid material, preferably between 10 and 25%. A suspension of satisfactory density is obtained when the velocity of the gas passing through the condensation zone is about 1.5 ft./second. It may be reiterated here that the finely divided solid employed for the production of the fluidized, dense suspension may be the material the recovery of which from the vapor mixture is desired in solid form, or it may be an inert solid.

In cases where the finely divided material is substantially uniform in size whereby fluidization thereof presents a problem, it is expedient to employ packing such as Raschig rings, berl saddles, ceramic balls, or the like, in the condensation zone. In this case the finely divided material is introduced into the upper part of the zone and allowed to trickle downwardly against the rising stream of vapor to be condensed, the velocity of the latter being such as to maintain the finely divided material in a vibrating ebullient condition in the interstices of the packing. In this embodiment there is contemplated the use of spaced packed sections with cooling coils in the free spaces between the sections.

Further objects and advantages of the present invention will appear from the following detailed description of the accompanying drawing in which Fig. 1 is a front elevation in diagrammatic form of an apparatus suitable for practicing one embodiment of the present invention.

Figure 2:
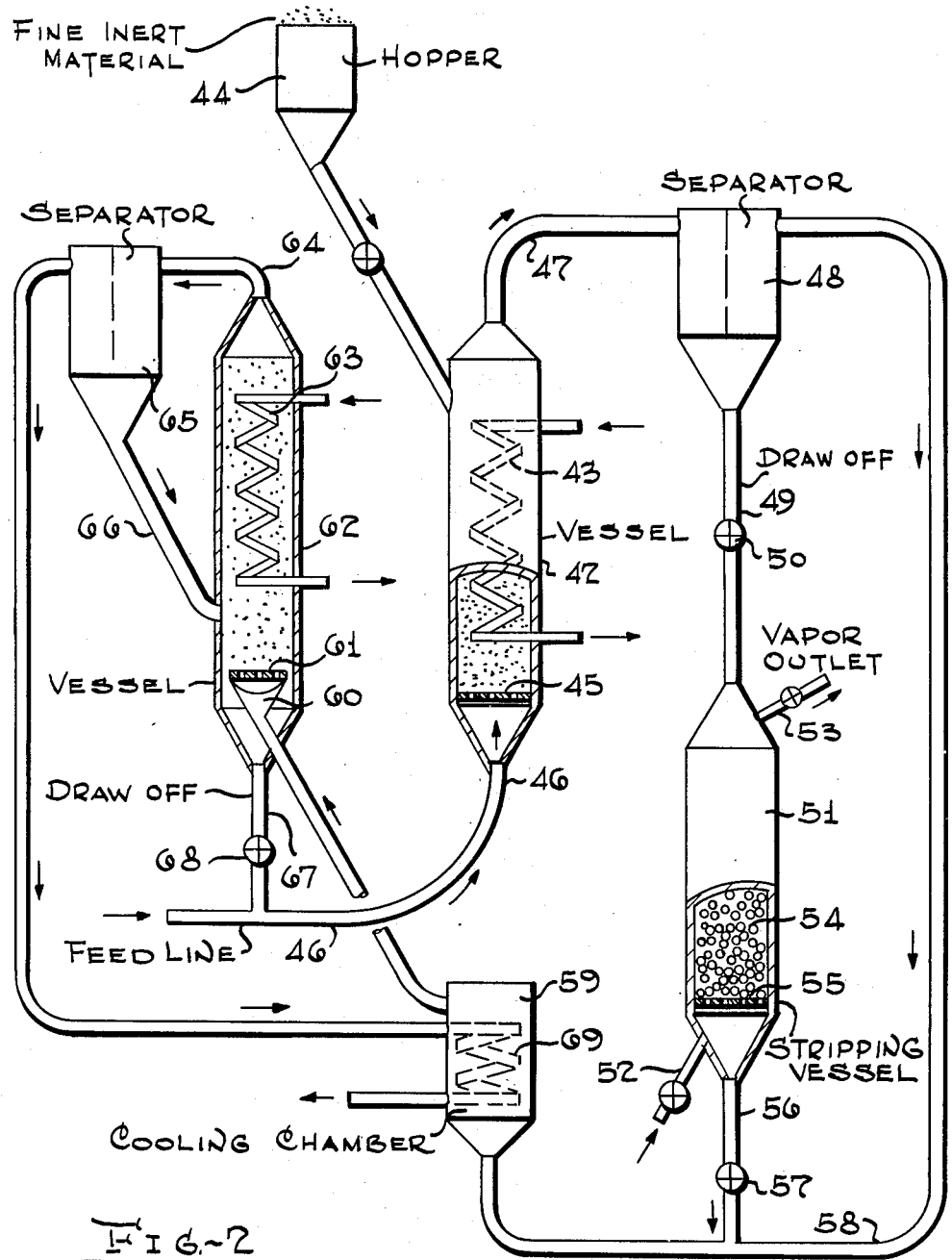
Figure 3:
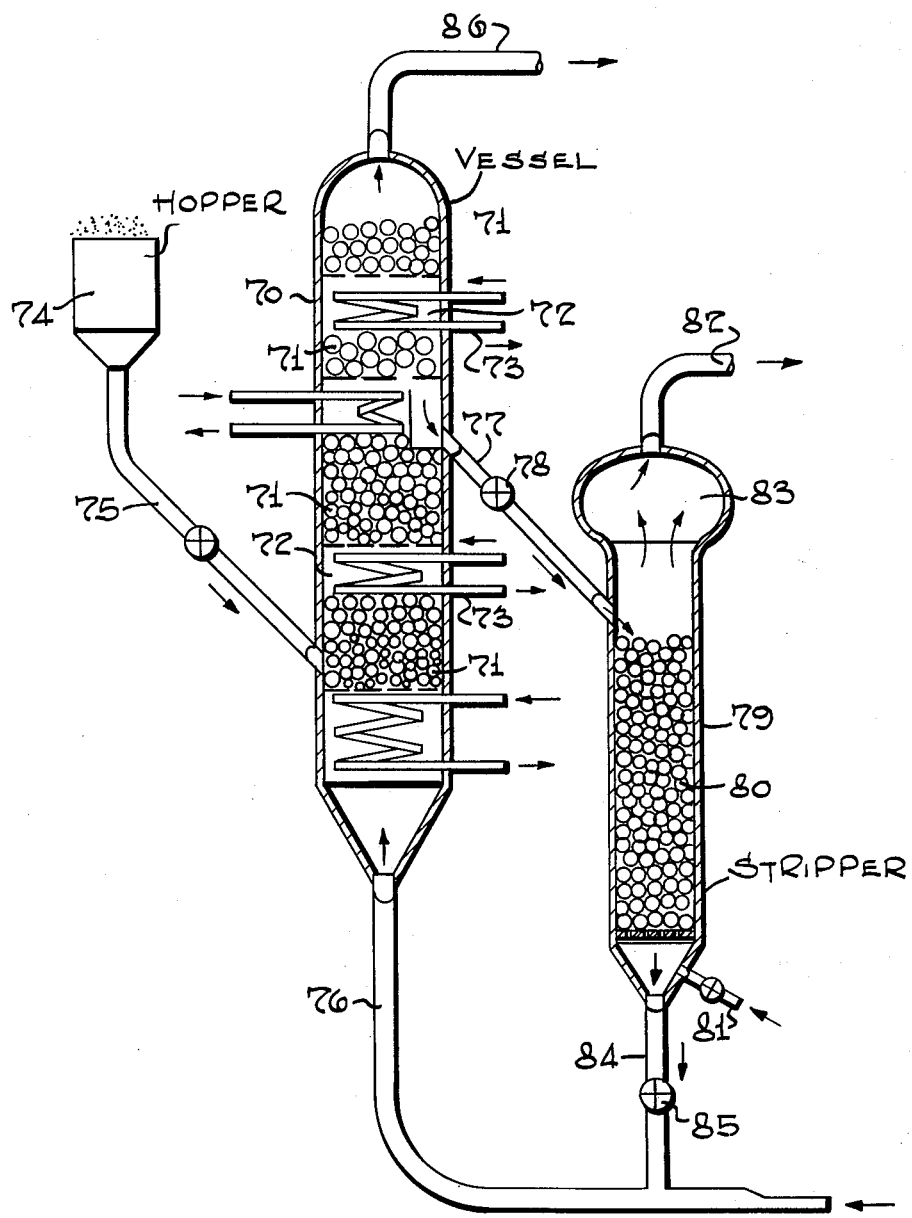

Fig. 2 is a similar view of an apparatus suitable for the practice of another embodiment of the present invention; and Fig. 3 is a similar view of an apparatus suitable for the practice of still another embodiment of the present invention.

Referring to Fig. 1, numeral 1 designates a vessel provided with an internal cooling means such as cooling coil 2. It will be understood that the cooling means is illustrated by a simple coil merely to facilitate the description, the various well known types of cooling equipment being contemplated. In a lower portion of the vessel 1 is a funnel-like member 3 covered with a grid 4 and having a depending pipe 5 which passes out of vessel 1 and constitutes the feed line for the vaporous mixture to be condensed. Near its upper end the vessel has attached thereto a feed hopper 6 from which finely divided solid material can be introduced into the vessel at least at the beginning of the operation. As previously indicated, the rate of feed of the finely divided solid material to the vessel 1 is correlated with its rate of withdrawal therefrom and with the velocity of the vapors passing through the vessel so as to maintain in the vessel a dense suspension of finely divided solid having a relatively definite level 7. Terminating at this level is the open end of a duct 8 which discharges into the overhead line 9 which carries vapors from the vessel.

Solid is continuously withdrawn from the bottom of vessel 1. Part of this solid is removed from the system through line 10 controlled by valve 11. Another part passes through star feeder 12 into cooling chamber 13 having a cooling coil 14 and thence into a screw conveyor 15 which feeds the solid into the vaporous feed line 5.

Line 9 discharges into the lower end of a second vessel 16 which may, if desired, be identical in construction with vessel 1. For simplicity, vessel 16 is shown merely as containing a cooling coil 17 and a bottom draw-off for solids 18 controlled by a valve 19 through which solid from vessel 16 may be returned to cooler 13 and thence back to vessel 1. Vessel 16 may be provided with a hopper 20 for the introduction of solid material into the condensation zone in vessel 16. The content of solids in this zone and the velocity of the gas passing through it are preferably adjusted so as to maintain a dense suspension of solids therein.

The residual gaseous mixture passing overhead from vessel 16 through line 22 discharges into a cyclone or other separator 23 from the bottom of which solid is drawn off through line 24 while residual gas leaves through line 25.

For a final clean-up of the residual gas it is passed through a third condensation zone 26 having a cooling coil or other cooling means 27 and provided near its bottom with a grid or grate 28. This vessel may also be provided with a suitable hopper 29 for the introduction thereinto of solid material at least at the beginning of the operation. In the foregoing discussion of this system the solid material referred to is the solid form of the vaporous constituent to be recovered. The solid employed in vessel 26, however, is an inert solid such as an inorganic gel, clay, sand, or carbon.

In vessel 26, as shown, the velocity of the gas is so regulated that all of the solid introduced into the vessel leaves overhead although there is sufficient hold up in the chamber to maintain in the condensation zone a dense suspension of solid. The gas plus the solid leaves vessel 26 overhead through line 30 and discharges into a cyclone or other separator 31 from the bottom of which solid is withdrawn through line 32 and passes through a star feeder 33 into a stripping zone. Residual gas leaves the separator 31 through line 34.

The stripping zone is contained in vessel 35 which is filled with packing 36 such as Raschig rings, berl saddles, ceramic balls, or the like. This packing will, of course, be of very large size compared to the finely divided solid, which latter will contain no particles too large to pass through the interstices in the packing. The packing is supported on a grid or grate 37.

Superheated vapors of the substance to be recovered undiluted with non-condensible gas are fed into the bottom of vessel 35 through line 38, pass upwardly through the packing countercurrent to the finely divided material and leave the top of the vessel through line 39 by which they are conducted to a suitable condenser. If desired, the superheated vapors used in this step may be vapors of a liquid in which the substance to be recovered is relatively insoluble or immiscible. Superheated vapors of toluene, xylenes, and the like, are suitable for this purpose.

The stripped solid leaves the bottom of the vessel 35 through line 40 and passes in controlled amounts through star feeder 41 into line 25 which carries it back into chamber 26.

In operating this system for the recovery of phthalic anhydride from the gaseous products of naphthalene oxidation with air, the system may be started by feeding in finely divided phthalic anhydride from hopper 6 into vessel 1 while passing air through feed line 5 at a rate sufficient to establish a dense suspension of the finely divided material in vessel 1. At the same time cooling liquid is passed through the cooling coil 2 until a stable temperature in the neighborhood of 150° to 185° F. is established in the dense suspension. The optimum temperature at this point depends on the dew point of the vapors from the oxidation stage. In general, the higher this dew point, the higher the optimum temperature in vessel 1. At this point the air feed in line 5 may be replaced by the gaseous feed containing the vapors of phthalic anhydride. This gaseous feed may be precooled to a temperature in the neighborhood of that maintained in the condensation zone. It will be observed that this temperature is one at which phthalic anhydride will condense but still has a substantial vapor pressure. The overhead from vessel 1 passes through vessel 16 which is maintained at a temperature between about 115° and 135° F., which is considerably below the vaporizing temperature of phthalic anhydride. Solid phthalic anhydride is continuously withdrawn from the system through lines 10 and 24.

The off-gas from vessel 16 passes through vessel 26 which is likewise maintained at a temperature between about 115° and 135° F. The inert solid carrying any condensed phthalic anhydride is stripped with phthalic anhydride vapors, superheated to a temperature above about 300° F., in vessel 35. The phthalic anhydride vapor leaving this vessel through line 39 is condensed in a separate zone where it is not contaminated with diluting gases.

In the embodiment shown in Fig. 2, an inert finely divided solid is used throughout the system. The operation in this embodiment is also a two-stage operation in which the first stage is conducted at a somewhat higher temperature than the second stage. In this embodiment the first stage is conducted in vessel 42 provided with cooling equipment 43. Near its upper end it is connected with a hopper 44 for the introduction of finely divided inert material into the system. At its lower end it is provided with a grid or grate 45 below which is the feed line 46 for the vapors to be condensed. These vapors carry in finely divided solid material and carry it upwardly through the vessel 42, the rate of feed of the solid material and the velocity of the vapors being so adjusted that there is considerable hold up of solid in the vessel 42 forming a dense fluidized suspension.

A mixture of vapor and solid leaves vessel 42 overhead through line 47 and discharged into a cyclone or other separator 48 from the bottom of which solid leaves through draw-off 49 and passes in controlled amounts through star feeder 50 into a stripping vessel 51 which is identical in all respects with vessel 35 in Fig. 1. The feed line for superheated concentrated vapor at the bottom of the vessel is designated by numeral 52 and the exit line for this vapor at the top of the vessel is designated by numeral 53. The packing 54 rests on a grate or grid 55.

The solid leaves the bottom of the vessel through line 56 and passes through star feeder 57 into line 58 which is the overhead line from the separator 48 and carries gases still containing some vaporous material to be recovered. The resulting mixture of gas and solid in line 58 passes through a cooling chamber 59 and thence into a discharge funnel 60 covered with a grid 61 and located in the bottom portion of vessel 62 provided with cooling means 63. In this case the velocity of the vapor is so adjusted to the rate of feed of the solid to the vessel that very little solid leaves the vessel overhead through line 64 which discharges into a cyclone or other separator 65. Solid separated in this separator is returned to vessel 62 through line 66.

It may be mentioned here that for finely divided material of the particle size distribution hereinbefore mentioned the gas velocity in an upflow vessel, such as vessel 42, will preferably be in the upper end of the range heretofore given and for such velocity the rate of feed of solid may be between 10 and 100 lbs. per minute per square foot of free space in the vessel. For a downflow operation such as occurs in vessel 62 the velocity will be in the lower end of the range heretofore given and the feed rate of solid may be between 10 and 500 lbs. per minute per square foot of free space, the density of the suspension being greater the greater the feed rate of this solid for a given gas velocity.

The solid falls out of the dense suspension in vessel 62 by gravity and leaves the bottom thereof through draw-off 67 and is fed in controlled amounts by star feeder 68 into feed line 46. The cold residue gas leaving the separator 65 is conveniently passed through a tube bundle 69 in cooler 59 to cool the mixture of gas and solid being fed to the vessel 62.

In the operation conducted in the apparatus shown in Fig. 3 an inert finely divided material is employed. In this case the finely divided material is not maintained as a dense, fluidized suspension throughout the condensation zone. Instead the condensation zone which is contained in vessel 70 has a plurality of spaced packed sections 71. Between these packed sections are free spaces 72 in which are arranged the cooling equipment 73. The packing in the upper packed sections may be of larger size than that in the lower packed sections so as to cause a decrease in the velocity which permits the settling out of suspended solid from the gaseous stream.

Connected to one side of the vessel 70 is a hopper 74 which feeds finely divided material to the vessel 70 through drop leg 75. This finely divided material may be introduced at any desired point in vessel 70.

The vaporous mixture to be condensed enters the bottom of the vessel through line 76 and passes upwardly with sufficient velocity to exert a partial lifting action on the finely divided material. By suitably adjusting the velocity of the gas and the rate of feed of the finely divided material this finely divided material is maintained in the packed sections in the form of an ebullient mixture in the interstices of the packing and in the free spaces in the form of a turbulent fluidized mixture. If the finely divided material is substantially uniform in diameter, the unpacked zones are preferably proportioned so as to have a length over diameter not substantially greater than one. Where the finely divided material includes particles of various sizes, however, fluidization may be attained in the free spaces regardless of the L/D.

Near the upper end of the vessel 70 is a duct 77 having its open upper end terminating in a free space between packed sections and having its other end discharging through a star feeder 78 into the upper end of a stripper 79 filled with packing 80. Hot superheated vapors of the substance to be recovered, or other suitable condensible substance, are introduced into the bottom of stripper 79 through line 81 and leave the upper end thereof through line 82 after passing through an enlarged section 83 in which any finely divided solid entrained in these vapors has an opportunity to drop back into the packed zone. The stripped solid leaves the bottom of the stripper through line 84 and is fed in a controlled manner by way of star feeder 85 into feed line 76. The residual gases from which the condensible constituent has been recovered leave vessel 70 through overhead line 86. It may be mentioned here that the different free spaces in vessel 70 may be maintained at different temperatures, the lower ones being maintained at a temperature at which the material to be recovered condenses but still has a substantial vapor pressure and the upper free spaces being maintained at a substantially lower temperature.

It will be apparent that the method of the present invention is susceptible to many changes in procedural detail without any change in its essential character. Various expedients will occur to one skilled in the art. As heretofore indicated, either upflow or downflow operation can be conducted in any of the vessels, or, as shown, some can be downflow and others upflow. No attempt has been made to indicate all of the possible heat economy features which are possible by the provision of heat exchangers at suitable points. The particular embodiments described are purely illustrative of the present invention and are not intended to define its limits.

The nature and objects of the present invention having been described and illustrated, what is claimed as new and useful and is desired to be secured by Letters Patent is:

1. A method for recovering a normally solid sublimable material from a gaseous stream in which said sublimable material is in vaporous form mixed with noncondensible gas, which comprises passing said vapor stream upwardly through a zone maintained at a temperature which starts condensation of said sublimable material but at which said sublimable material still has a substantial vapor pressure; feeding into said zone with said vapor stream said sublimable material in finely divided solid form; regulating the velocity of said vapor stream up through said zone and feeding into said zone a sufficient amount of said sublimable material in finely divided solid form to maintain said finely divided solid material in the form of a fluidized dense suspension up through which the gaseous stream is passed and carries upwardly therewith small particles of the sublimable material undergoing vaporization; cooling the fluidized finely divided solid sublimable material in said zone as it is contacted with the upflowing gaseous stream so that a portion of the sublimable material vapor condenses on cooler surfaces of said fluidized solid to form therewith larger size solid particles; passing the remaining gaseous stream containing vapor of the normally solid sublimable material leaving said zone into a second zone maintained at a substantially lower temperature; continuously introducing into said second zone said sublimable material in finely divided solid form to maintain in said second zone a fluidized dense suspension of said material in the up-flowing vapor stream; cooling the fluidized solid contacted with the vapor stream in said second zone so that a remaining portion of the sublimable material vapor in the vapor stream condenses on cooler surfaces of said fluidized solid; and continuously withdrawing thus formed large particles from each of said zones.

2. The method according to claim 1, in which a remaining part of the gaseous stream containing residual vapor of the sublimable material is passed upwardly through said second zone on leaving the upper part of said second zone is passed upwardly through a fluidized dense suspension of finely divided solid inert material which is nonvolatile and of a different character from said sublimable material; cooling the fluidized dense suspension of the finely divided inert material to a temperature at which the remaining vapor of the sublimable material is condensed thereon; continuously withdrawing from said suspension the finely divided solid material carrying the condensed sublimable material; vaporizing the sublimable material from the inert solid material; and returning the inert solid material to said fluidized dense suspension.

3. A method for recovering phthalic anhydride from a gaseous mixture of its vapor diluted with noncondensible gas, which comprises feeding finely divided solid phthalic anhydride into a first of series of condensation zones; establishing a dense fluidized suspension of the finely divided solid phthalic anhydride in the first condensation zone by passing upwardly therethrough said gaseous mixture; cooling the dense suspension in said first condensation zone to a temperature of between 150° and 185° F. so that phthalic anhydride vapor in the vapor stream condenses on cooler surfaces of the finely divided solid phthalic anhydride to form therewith large size solid particles while smaller solid particles of phthalic anhydride are carried upwardly by the gaseous mixture and undergo vaporization; passing a remaining portion of the gaseous mixture in which the phthalic anhydride has a substantial vapor pressure from an upper part of said first zone into a second condensation zone; introducing into said second condensation zone finely divided solid; passing said remaining portion of the gaseous mixture from the first zone up through the second condensation zone to establish a second dense fluidized suspension; maintaining said second dense suspension at a temperature between 115° F. and 135° F. to condense more of the phthalic anhydride vapor from said remaining gaseous mixture on the finely divided solid in the second suspension; and withdrawing from said zones finely divided solids having phthalic anhydride condensed thereon as a solid.

WARREN K. LEWIS.

REFERENCES CITED

The following references are of record in the file of this patent:

UNITED STATES PATENTS

| Number | Name | Date |
| --- | --- | --- |
| 1,953,937 | Jaeger | Apr. 10, 1934 |
| 2,303,047 | Hemminger | Nov. 24, 1942 |
| 2,455,314 | Pietzsh | Nov. 30, 1948 |
| 2,475,255 | Rollman | July 5, 1949 |
| 2,537,044 | Garbo | Jan. 9, 1951 |